United States Patent [19]

Arita et al.

[11] Patent Number: 4,761,457
[45] Date of Patent: Aug. 2, 1988

[54] PROCESS FOR PRODUCING CROSS-LINKED RESINS

[75] Inventors: Kazuhiro Arita, Takatsuki; Yasuo Sano, Minoo, both of Japan

[73] Assignee: Takeda Chemical Industries, Ltd., Osaka, Japan

[21] Appl. No.: 20,209

[22] Filed: Mar. 6, 1987

Related U.S. Application Data

[63] Continuation of Ser. No. 874,894, Jun. 16, 1986, abandoned, which is a continuation of Ser. No. 679,008, Dec. 6, 1984, abandoned.

[30] Foreign Application Priority Data

Dec. 26, 1983 [JP]  Japan ................................. 58-248642
Oct. 18, 1984 [JP]  Japan ................................. 58-219253

[51] Int. Cl.$^4$ ............................................. C08G 63/76
[52] U.S. Cl. .................................... 525/439; 525/437; 528/172; 528/286; 528/288; 528/290
[58] Field of Search ................ 525/437, 439; 528/286, 528/288, 290, 172

[56] References Cited

U.S. PATENT DOCUMENTS

| | | | |
|---|---|---|---|
| 3,244,771 | 4/1966 | Krauss | 525/439 |
| 3,966,836 | 6/1976 | de Cleur | 528/438 |
| 4,137,221 | 1/1979 | Hara | 528/273 |
| 4,474,942 | 10/1984 | Sano | 528/363 |

Primary Examiner—Patricia Short
Attorney, Agent, or Firm—Wenderoth, Lind & Ponack

[57] ABSTRACT

A process for producing a novel cross-linked resin which comprises: reacting a bis(2-oxazoline) compound with a polyesterpolycarboxylic acid which has carboxylic acid ester linkages in the molecule, in an equivalent ratio of the bis(2-oxazoline) compound to the carboxyls of the polyesterpolycarboxylic acid not less than 1 at an elevated temperature.

The cross-linked resin has excellent physical and chemical properties inclusive of mechanical strength and resistance to various chemicals, and may be usable, for example, for embedded moldings of electrical machinery, electric insulating materials, films, adhesives and coating compositions.

The polyesterpolycarboxylic acid which has carbonic acid ester linkages as well as carboxylic acid ester linkages in the molecule provides a cross-linked resin which is in particular excellent in elongation and impact strength.

1 Claim, No Drawings

PROCESS FOR PRODUCING CROSS-LINKED RESINS

This application is a continuation, of application Ser. No. 874,894, filed June 16, 1986, now abandoned, which is a continuation of application Ser. No. 679,008, filed Dec. 6, 1984, now abandoned.

This invention relates to a process for producing novel cross-linked resins.

It is already known, as disclosed in U.S. Pat. No. 3,476,712, that the reaction of a bis(2-oxazoline) compound with a dicarboxylic acid in an equimolar amount under heating produces linear polyesteramides.

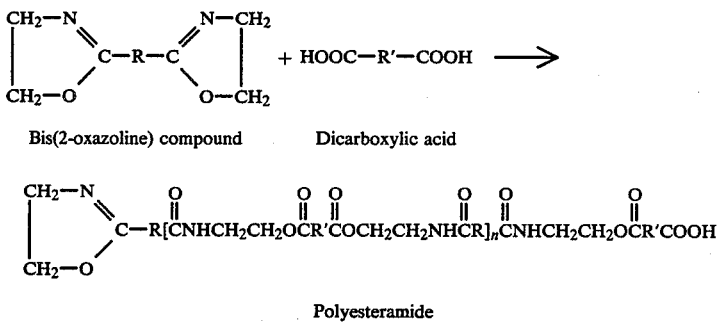

Bis(2-oxazoline) compound     Dicarboxylic acid

Polyesteramide

However, no thermosetting resin has hitherto been known which is formed by making use of a bis(2-oxazoline) compound as a reactant. The present inventors have made an intensive investigation on the reaction of a bis(2-oxazoline) compound with a variety of compounds, and have found that the reaction of a bis(2-oxazoline) compound with a polyesterpolycarboxylic acid which has ester linkages in the molecule at an elevated temperature involves the ring-opening of the oxazoline ring initiated by the acidic hydrogen of the polyesterpolycarboxylic acid, and readily provides a novel three-dimensionally cross-linked resin which has excellent mechanical strength and resistance to various chemicals.

It is therefore an object of the invention to provide a process for producing novel cross-linked resins.

The process for producing cross-linked resins of the invention comprises: reacting a bis(2-oxazoline) compound with a polyesterpolycarboxylic acid which has carboxylic acid ester linkages in the molecule, in an equivalent ratio of the bis(2-oxazoline) compound to the carboxyls of the polyesterpolycarboxylic acid not less than 1 at an elevated temperature.

The polyesterpolycarboxylic acid having ester linkages in the molecule used in the present invention may be prepared, for example, by reacting a polyhydric alcohol with a polycarboxylic acid or its anhydride. The amount of the polycarboxylic acid used is so selected that the molar ratio of the carboxyls of the polycarboxylic acid to the hydroxyls of the polyhydric alcohol is preferably in the range of about 1.1–4, and most preferably about 2. The amount of the polycarboxylic acid anhydride used in turn is so selected that the equivalent ratio of the hydroxyls of the polyhydric alcohol to the acid anhydride ring of the polycarboxylic acid anhydride is not more than 1. For instance, when a diol is reacted with a dicarboxylic acid or its anhydride, the molar ratio of the latter to the diol is most preferably about 2.

The polyesterpolycarboxylic acid thus obtained has normally 2–6 carboxyls in the molecule depending on the polycarboxylic acid and polyhydric alcohol used.

The polyhydric alcohol usable for the preparation of the polyesterpolycarboxylic acid includes, for example, glycols such as ethylene glycol, propylene glycol, 1,3-butylene glycol, 1,4-butanediol, neopentyl glycol, dibromoneopentyl glycol, hydrogenated bisphenol A, diethylene glycol, triethylene glycol, dipropylene glycol or propylene oxide adducts of bisphenol A; oligomerdiols such as polyethylene glycol, polypropylene glycol, polytetramethylene glycol or polybutadiene diol; triols such as trimethylolethane, trimethylolpropane, hexanetriol, glycerine or tris(hydroxyethyl)isocyanurate; tetraols such as pentaerythritol; and others such as xylitol, sorbitol or sucrose. These polyhydric alcohols may be used as a mixture of two or more.

The polycarboxylic acid usable for preparing the polyesterpolycarboxylic acid includes, for example, aliphatic dicarboxylic acids such as malonic acid, succinic acid, glutaric acid, adipic acid, pimelic acid, suberic acid, azelaic acid, sebacic acid, dodecandioic acid, dimer acid, eicosandioic acid or thiodipropionic acid; aromatic dicarboxylic acids such as phthalic acid, isophthalic acid, terephthalic acid, naphthalenedicarboxylic acid, diphenylsulfonedicarboxylic acid or diphenylmethanedicarboxylic acid; and polycarboxylic acids such as trimellitic acid, trimesic acid, pyromellitic acid or butane-1,2,3,4-tatracarboxylic acid. The polycarboxylic acid may be used as a mixture of two or more.

The polycarboxylic acid anhydride includes, for example, succinic anhydride, maleic anhydride, itaconic anhydride, phthalic anhydride, tetrahydrophthalic anhydride, hexahydrophthalic anhydride, methylhexahydrophthalic anhydride, endomethylenetetrahydrophthalic anhydride, tetrachlorophthalic anhydride, tetrabromophthalic anhydride, trimellitic anhydride, pyromellitic anhydride and 4,4'-benzophenonetetracarboxylic dianhydride. The polycarboxylic acid anhydide may be used as a mixture of two or more. Also a mixture of the polycarboxylic acid and polycarboxylic acid anhydride may be used.

Among the above polycarboxylic acids and polycarboxylic acid anhydrides, dicarboxylic acids and dicarboxylic acid anhydrides are preferably used.

The reaction of polyhydric alcohol with the polycarboxylic acid or polycarboxylic acid anhydride is carried out usually at a temperature of about 100°–250° C., and the reaction time is usually in the range of several minutes to about 20 hours.

The reaction of the polyhydric alcohol with the polycarboxylic acid or polycarboxylic acid anhydride provides a polyesterpolycarboxylic acid which has carboxylic acid ester linkages in the molecule. As a specific example, when a dicarboxylic acid anhydride is reacted with a diol in the molar ratio of the anhydride to the diol of 2, the reaction is represented by the following eqation:

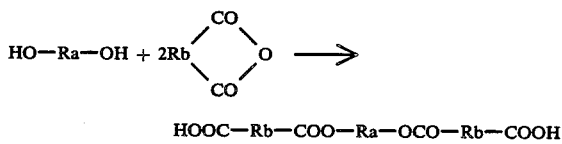

wherein Ra and Rb represent hydrocarbon residues.

According to the invention, the polyesterpolycarboxylic acid specifically includes those which have carbonic acid ester linkages or carbonate linkages as well as caboxylic acid ester linkages in the molecule. This polyesterpolycarboxylic acid may be prepared by a method already known. For example, first a polyhydric alcohol is reacted with a carbonate derivative which includes phosgene, diaryl carbonates such as diphenyl carbonate or alkylene carbonates such as ethylene carbonate to provide a polycarbonatepolyol which has carbonate linkages in the molecule and hydroxyls at the terminals of the molecule. Then the polycarbonatepolyol is reacted with an excess amount of a polycarboxylic acid or its anhydride, thereby to provide the polyesterpolycarboxylic acid which has carbonate ester linkages and carboxylic acid ester linkages in the molecule. As obvious, the polyhydric alcohols, polycarboxylic acids and their anhydrides which were hereinbefore mentioned are usable in the above reaction. Among the polycarboxylic acids and anhydrides are preferred aliphatic dicarboxylic acids and their anhydrides.

Among the polycarbonatepolyols, a polycarbonatediol is in particular preferred, which has the general formula of

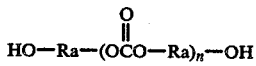

wherein Ra represents a hydrocarbon residue such as an alkylene, arylene or a cycloalkylene which may include ether linkages therein, and n represents an integer not less than 1, preferably ranging from about 1–25, is preferably used for the preparation of polyesterpolycarboxylic acid which includes carbonate ester linkages as well as carboxylic acid ester linkages. The above polycarbonatediol may be prepared by reacting a glycol with the carbonate derivative as hereinbefore mentioned, and hence Ra in the above formula is the residual group of the glycol used. It is further preferred that a straight chain glycol having 4–6 carbons such as 1,4-butanediol, 1,6-hexanediol or diethylene glycol is used for preparing the polycarbonatediol, and further that the resultant polycarbonatediol has an integer of n of about 3–20 so as to obtain a cross-linked resin which is in particular excellent in elongation and impact strength.

Similarly to the reaction of the polyhydric alcohol with the polycarboxylic acid to provide the polyesterpolycarboxylic acid, also in the reaction of the polycarbonatepolyol with the polycarboxylic acid to form a polyesterpolycarboxylic acid which has carbonate linkages and carboxylic acid ester linkages in the molecule, the amount of the polycarboxylic acid used is so selected that the molar ratio of the carboxyls of the polycarboxylic acid to the hydroxyls of the polyhydric alcohol is preferably in the range of about 1.4–4, and most preferably about 2. When the polycarboxylic acid anhydride is reacted with the polycarbonatepolyol, the amount of the former used is so selected that the equivalent ratio of the hydroxyls of the polyhydric alcohol to the acid anhydride ring of the polycarboxylic acid anhydride is not more than 1. For instance, when a diol is reacted with a dicarboxylic acid or its anhydride, the molar ratio of the latter to the diol is most preferably about 2.

The reaction of the polycarbonatepolyol with the polycarboxylic acid or its anhydride is also carried out usually at a temperature of about 100°–250° C.

Specifically when a dicarboxylic acid anhydride is reacted with the polycarbonatediol in the molar ratio of the polycarboxylic acid anhydride to the diol of 2, the reaction is represented by the following eqation:

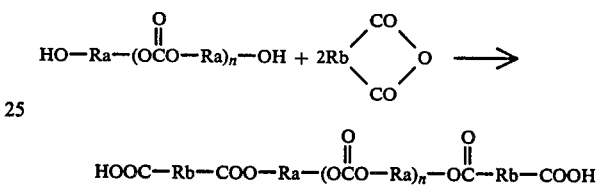

wherein Rb represents a hydrocarbon residue, e.g., the residual group of the dicarboxylic acid used, to provide polyesterpolycarboxylic acid having carbonate linkages and carboxylic acid ester linkages.

According to the invention, a bis(2-oxazoline) compound is reacted with the polyesterpolycarboxylic acid at an elevated temperature. In this reaction the active hydrogen of the carboxylic groups in the polyesterpolycarboxylic acid causes the ring-opening reaction of the oxazoline ring to produce esteramide linkages, and then the active hydrogen in the esteramide linkage also causes the ring-opening of another oxazoline ring to form cross-linking, thereby to produce a cross-linked resin.

The bis(2-oxazoline) compound preferably used in the present invention has the general formula:

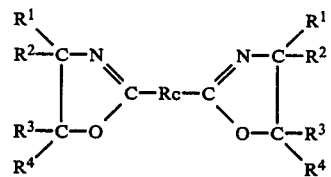

wherein Rc represents a C—C covalent bond or a divalent hydrocarbon group, preferably an alkylene, a cycloalkylene or an arylene, e.g., phenylene, and $R^1$, $R^2$, $R^3$ and $R^4$ independently represent hydrogen, an alkyl or an aryl. In the case where Rc is a C—C covalent bond, the bis(2-oxazoline) compound may be 2,2'-bis(2-oxazoline), 2,2'-bis(4-methyl-2-oxazoline) or 2,2'-bis(5-methyl-2-oxazoline). Examples of the bis(2-oxazoline) compound wherein Rc is a hydrocarbon group are 1,2-bis(2-oxazolinyl-2)ethane, 1,4-bis(2-oxazolinyl-2)butane, 1,6-bis(2-oxazolinyl-2)hexane, 1,8-bis(2-oxazolinyl-2)octane, 1,4-bis(2-oxazolinyl-2)cyclohexane, 1,2-bis(2-oxazolinyl-2)benzene, 1,3-bis(2-oxazolinyl-2)benzene, 1,4-bis(2-oxazolinyl-2)benzene, 1,2-bis(5-methyl- 2-oxazolinyl-2)benzene, 1,3-bis(5-methyl-2-oxazolinyl-2)benzene, 1,4-bis(5-methyl-2-oxazolinyl-2)benzene and 1,4-bis(4,4'-dimethyl-2-oxazolinyl-2)benzene. These may be used as a mixture of two or more.

As previously mentioned, the polyesterpolycarboxylic acid may be in advance prepared, followed by the reaction with the bis(2-oxazoline) compound, however, when the polycarboxylic acid anhydride is to be used for the preparation of the polyesterpolycarboxylic acid, then the polyhydric alcohol, the anhydride and the bis(2-oxazoline) compound may be reacted together at the same time. In this case also, it is assumed that first the polyhydric alcohol reacts gradually with the anhydride to form a polyesterpolycarboxylic acid having ester linkages in the molecule, and then the polyesterpolycarboxylic acid reacts with the bis(2-oxazoline) compound to provide a cross-linked resin as set forth hereinbefore.

According to the invention, the amount of the bis(2-oxazoline) compound used is so selected that the equivalent ratio of the bis(2-oxazoline) compound to the carboxyls of the polyesterpolycarboxylic acid is not less than 1, preferably about 1.3-3, when a single oxazoline ring is defined as an equivalent.

In the reaction of the polyesterpolycarboxylic acid with the bis(2-oxazoline) compound, an organic compound which has at least one acidic active hydrogen in the molecule, which is herein referred to as the reactive compound, may be used as a further reactant in conjunction with the polyesterpolycarboxylic acid. The reactive compound specifically includes a dicarboxylic acid, a sulfonamide, an acid imide, an aromatic hydroxy-carboxylic acid and a bisphenol sulfone compound.

The dicarboxylic acid usable for preparing the polyesterpolycarboxylic acid are also usable as the reactive compoun. Therefore the dicarboxylic acid includes, for example, aliphatic dicarboxylic acids such as malonic acid, succinic acid, glutaric acid, adipic acid, pimelic acid, suberic acid, azelaic acid, sebacic acid, dodecandioic acid, dimer acid, eicosandioic acid or thiodipropionic acid and aromatic dicarboxylic acids such as phthalic acid, isophthalic acid, terephthalic acid, naphthalene dicarboxylic acid, diphenylsulfonedicarboxylic acid or diphenylmethanedicarboxylic acid.

The sulfonamide usable in the invention includes an aliphatic sulfonamide such as methanesulfonamide or ethanesulfonamide, and an aromatic sulfonamide such as benzenesulfonamide, o-toluenesulfonamide, p-toluenesulfonamide, naphthalene-$\alpha$-sulfonamide or naphthalene-$\beta$-sulfonamide. The sulfonamide further includes a cyclic sulfonamide, e.g., saccharin, which is readily obtainable by the oxidative cyclization of o-toluenesulfonamide.

The acid imide usable in the invention includes an open chain acid imide such as diacetamide and a cyclic acid amide such as succinimide, glutarimide, parabanic acid, hydantoin, dimethylhydantoin, isocyanuric acid, phthalimide or maleinimide. The cyclic imide is preferred among these acid imides.

The aromatic hydroxy-carboxylic acid used in the invention includes benzene derivatives, for example, salicylic acid, m-hydroxybenzoic acid, p-hydroxybenzoic acid, o-cresotic acid, gallic acid, mandelic acid and tropic acid, and naphthalene derivatives, for example, $\alpha$-hydroxynaphthoic acid, and $\beta$-hydroxynaphthoic acid.

The bisphenol sulfone compound usable in the invention includes 4,4'-dihydroxydiphenylsulfone (bisphenol S) and 3,3'-dihydroxydiphenylsulfone. The bisphenol sulfone compound may carry one or more substituents such as alkyls or halogens on either of the aromatic nuclei, as in tetrabromobisphenol S.

These reactive compounds may be used as a mixture of two or more. These are useful for the modification of various properties of the resultant cross-linked resin depending on uses thereof. The reactive compound is used usually in an amount of about 1-99 mole % of the total of the polyesterpolycarboxylic acid and the organic reactive compound. However, when the reactive compound is involved as a reactant, it is necessary that the bis(2-oxazoline) compound is used in such an amount that the equivalent ratio of the bis(2-oxazoline) compound to the total of the carboxyls of the polyesterpolycarboxylic acid and the active hydrogens which are reactive to the bis(2-oxazoline) compound in the reactive compound is not less than 1, preferably in the range of about 1.3-3.

The reaction of the bis(2-oxazoline) compound with the polyesterpolycarboxylic acid is preferably carried out at temperature not less than about 200° C., most preferably in the range of about 200°-250° C., and the reaction time ranges usually from about 30 minutes to about 10 hours, in the absence of a catalyst, which will be now set forth in detail.

According to the invention, the reaction is carried out preferably in the presence of a catalyst to shorten the reaction time and/or to lowers the reaction temperature.

Various inorganic and organic compounds are effective as the catalyst, and the first group of catalysts specifically includes a phosphorous acid ester, an organic phosphonous acid ester and an inorganic salt. Among these a phosphorous acid ester is most preferred particularly because of its high catalytic activity and high solubility in the reaction mixture.

The phosphorous acid ester is preferably a diester or a triester such as triphenyl phosphite, tris(nonylphenyl)phosphite, triethyl phosphite, tri-n-butyl phosphite, tris(2-ethylhexyl)phosphite, tris(p-chlorophenyl)phosphite, tristearyl phosphite, diphenylmonodecyl phosphite, tetraphenyl dipropyleneglycol diphosphite, tetraphenyltetra(tridecyl)pentaerythritoltetraphosphite, diphenyl phosphite, 4,4'-butylidenebis(3-methyl-6-t-butylphenyl-di-tridecyl)phosphite and bisphenol A pentaerythritol phosphite. These may be used as a mixture of two or more. Among these phosphites, those which have phenoxy or substituted phenoxy groups are particularly preferred.

Examples of organic phosphonous acid ester includes esters of an aliphatic or aromatic phosphonous acid, such as diphenyl phenylphosphonite, di($\beta$-chloroethyl)$\beta$-chloroethylphosphonite or tetrakis(2,4-di-t-butylphenyl)-4,4'-diphenylendiphosphonite.

Various inorganic salts soluble in the reaction mixture are also effective as the catalyst. It is preferred that the salt has not water of crystallization. Preferred inorganic salts usable as the catalyst are composed of a monovalent or tetravalent cation (inclusive of polyatomic cations, e.g., vanadyl or zirconyl) such as lithium, potassium, sodium, magnesium, calcium, titanium, zirconium, vanadium, chromium, manganese, iron, cobalt, nickel, copper, zinc, cadmium, aluminum, tin or cerium, with an anion such as a halide, a nitrate, a sulfate or a chlorate. Among these salts, cupric chloride, vanadium chloride, vanadyl chloride, cobalt nitrate, zinc chloride, manganese chloride and bismuth chloride exhibit excellent catalytic activity.

The second group of catalysts used in the invention includes an oxazoline ring-opening polymerization catalyst such as a strong acid, a sulfonic acid ester, a sulfuric acid ester or an organic halide which contains at least one halomethyl group in the molecule. The oxazoline ring-opening polymerization catalyst is already known, as described in, for example, Poymer J., Vol. 3, No. 1, pp. 35–39 (1972) and Polymerization Reaction Treatize Course 7, Ring-Opening Polymerization II, pp. 165–189, Kagaku Dojin (1973).

More specifically, the strong acid includes an inorganic acid such as oxoacid, e.g., phosphorous acid, sulfuric acid or nitric acid, and hydroacid, e.g., hydrochloric acid or hydrogen sulfide, and an organic acid such as phenyl phosphorous acid, methanesulfonic acid, benzenesulfonic acid, p-toluenesulfonic acid, dodecylbenzenesulfonic acid, naphthalene-$\alpha$-sulfonic acid, naphthalene-$\beta$-sulfonic acid, sulfanilic acid or phenylphosphonic acid.

The sulfonic acid ester includes methyl p-toluenesulfonate and ethyl p-toluenesulfonate. The sulfuric acid ester includes dimethylsulfuric acid and diethylsulfuric acid.

Preferred examples of the organic halide as defined above are a monohaloalkane and a polyhaloalkane such as methyl iodide, butyl chloride, butyl bromide, butyl iodide, lauryl bromide, allyl bromide or ethane tetrabromide. Other examples of the organic halide are mono- or polyhalomethylbenzenes, e.g., benzyl bromie and p,p'-dichloromethylbenzene. The organic halide as the catalyst further includes a haloalkane which has a hydroxyl and/or a carboxyl group in the molecule, such as $\alpha$-bromopropionic acid, 2,3-dibromopropanol or $\alpha$-bromobutyric acid.

Among the above catalysts, the phosphorous acid ester and sulfonic acid ester are preferred.

The catalyst is used in amounts of 0.1–5% by weight, preferably 0.3–3% by weight based on the weight of a mixture of the reactants, i.e., the polyesterpolycarboxylic acid and the bis(2-oxazoline) compound, and further the reactive compound when it is used as a reactant.

In the reaction of the invention, all the reactants may be first mixed and then heated to melt together, or each of them may be first heated to melt and then mixed together, and when necessary, followed by further heating. The catalyst may also be added at any stage. For instance, the catalyst may be added to either the bis(2-oxazolin) compound, the polyesterpolycarboxylic acid or the reactive compound, or the catalyst may be added to a mixture of the reactants before, during or after heating the mixture to melt.

In the presence of catalyst as above mentioned, the reaction temperature is usually in the range of about 130°–230° C., although it is not specifically limited since the reaction temperature depends on the individual reactants as well as the catalyst used. The reaction time also varies depending on the individual reactants and the catalyst used as well as the reaction temperature, but usually in the range of about 10 seconds to 3 hours.

According to the invention, cross-linked resins including reinforcements and/or fillers are also obtainable, for example, by mixing the reinforcement and/or filler with a mixture of the bis(2-oxazoline) compound, the polyesterpolycarboxylic acid, the reactive compound when being used, and the catalyst, and then by heating the resultant mixture to cause the cross-linking reaction.

As the reinforcement, fibrous one which is in use in the ordinary plastic industry is usable. Specific examples of such reinforcement are inorganic fibers such as glass fibers, carbon fibers, quartz fibers, ceramic fibers, zirconia fibers, boron fibers, tungsten fibers, molybdenum fibers, steel fibers, berylium fibers and asbestos fibers, natural fibers as cotton, flax, hemp, jute or sisal hemp, and synthetic fibers having heat-resistance at the reaction temperature such as polyamide fibers or polyester fibers. In order to improve adhesion to the cross-linked resin, the fibrous reinforcement may be treated in advance with, for example, chromium compounds, silane, vinyltriethoxysilane or aminosilane.

The amount of the reinforcement may be selected, for example, depending upon the viscosity of the molten mixture, the reinforcement used, the requirements for cured products, etc., however, it is usually in the range of about 3–95% by weight, preferably about 5–80% by weight based on the mixture of the reactants.

Various fillers may also be incorporated into the cross-linked resin. Preferred examples of the filler include oxides such as silica, alumina or titanium dioxide, hydroxides such as aluminum hydroxide, carbonates such as calcium carbonate or magnesium carbonate, silicates such as talc, clay, glass beads or bentonite, carbon materials such as carbon black, metal powders such as iron powder or aluminum powder. The amount of the filler may be selected as in the case of the reinforcement, and it is usually in the range of about 3–500% by weight, preferably about 5–200% by weight based on the mixture of the reactants.

The cross-linked resin produced according to the present invention has ester linkages, secondary and tertiary amide linkages in the molecule, and therefore has excellent mechanical strength and resistance to chemicals such as organic solvents. Furthermore, the cross-linked resin is provided with a wide range of physical and chemical properties by selecting the bis(2-oxazoline) compound, polyesterpolycarboxylic acid and reactive compound, and their amounts used.

When the polyesterpolycarboxylic acid which has carbonate linkages as well as carboxylic acid ester linkages in the molecule is used, the resultant cross-linked resin has in particular a large elongation and an excellent impact resistance.

Furthermore, the present process permits a rapid curing of the reactants, so that the reaction system is suitably applicable to the reactive injection molding (RIM).

Therefore, the cross-linked resin may be preferably usable, for example, for embedded moldings of electrical machinery, electric insulating materials, films, adhesives and various coating compositions. The cross-linked resin which includes therein reinforcements and/or fillers provides resin molds with superior mechanical properties, and find applications in variuos uses.

The present invention will be more easily understood with reference to the following examples, which however are intended to illustrate the invention only and are not to be construed as limiting the scope of the invention. In the examples, the heat deflection temperature was measured under a load of 18.6 kg applied to a sample resin sheet, the water absorption was measured by the increase in weight of a sample in the form of disc after immersing in water at 23° C. for 24 hours, and the hardness was measured with a Barcol impressor.

EXAMPLE 1

A mixture of 8.5 g (0.14 mole) of ethylene glycol and 27.3 g (0.27 mole) of succinic anhydride was heated at 140°-145° C. for 10 minutes. The reaction mixture was cooled, and was then added thereto 44.2 g (0.20 mole) of 1,3-bis(2-oxazolinyl-2)benzene and 1.6 g of triphenyl phosphite. The mixture was then heated to melt together, and was poured into a mold which had a cavity of 0.3 cm×19 cm×13 cm and had been in advance heated to 200° C., and then was left standing in an oven at 200° C. for 1 hour to allow the mixture to form a cross-linked resin.

After cooling, the cured sheet 3 mm in thickness was taken out of the mold, and was subjected to measurements of the properties, which are shown below.

| Heat deflection temperature | 74° C. |
|---|---|
| Hardness | 45 |
| Water absorption | 2.1% |
| Flexural strength | 20.1 kgf/mm$^2$ |
| Flexural modulas | 500 kgf/mm$^2$ |

EXAMPLE 2

A mixture of 23.4 g (0.26 mole) of 1,4-butanediol and 52.2 g (0.52 mole) of succinic anhydride was heated at 150°-155° C. for 10 minutes. The reaction mixture was cooled, and was added thereto 84.4 g (0.40 mole) of 1,3-bis(2-oxazolinyl-2)benzene and 2.4 g of triphenyl phosphite. The mixture was then heated to melt together, and was poured into a mold which had a cavity of 0.3 cm×30 cm×13 cm and had been in advance heated to 190° C., and then was left standing in an oven at 190° C. for 1 hour to allow the mixture to form a cross-linked resin.

After cooling, the cured sheet 3 mm in thickness was taken out of the mold, and was subjected to measurements of the properties, which are shown below.

| Heat deflection temperature | 52° C. |
|---|---|
| Hardness | 45 |
| Water absorption | 1.9% |
| Flexural strength | 10.4 kgf/mm$^2$ |
| Flexural modulas | 270 kgf/mm$^2$ |

EXAMPLE 3

A mixture of 10.1 g (0.11 mole) of 1,4-butanediol and 33.4 g (0.22 mole) of phthalic anhydride was heated at 155°-160° C. for 15 minutes, and was then cooled. To the reaction mixture was added 36.5 g (0.17 mole) of 1,3-bis(2-oxazolinyl-2)benzene and 2.0 g of tris(nonylphenyl)phosphite, and the resulting mixture was heated to melt together. The molten mixture was poured into a mold as used in Example 1 heated in advance to 205° C., and then was cured at 205° C. for 30 minutes.

After cooling, the cured sheet 3 mm in thickness was taken out of the mold, and was subjected to measurements of the properties, which are shown below.

| Heat deflection temperature | 75° C. |
|---|---|
| Hardness | 45 |
| Water absorption | 0.21% |
| Flexural strength | 15.5 kgf/mm$^2$ |
| Flexural modulas | 390 kgf/mm$^2$ |

EXAMPLE 4

A mixture of 53.4 g (0.20 mole) of dibromoneopentyl glycol and 40.8 g (0.40 mole) of succinic anhydride was heated at 150°-155° C. for 15 minutes. The mixture was cooled, and was added thereto 66.0 g (0.30 mole) of 1,3-bis(2-oxazolinyl-2)benzene and 3.2 g of tris(p-chlorophenyl)phosphite and the resulting mixture was heated to melt together. The mixture was then poured into a mold as used in Example 1 in advance heated to 195° C., and then was cured at 195° C. for 1 hour.

After cooling, the cured sheet 3 mm in thickness was found to have the following properties:

| Heat deflection temperature | 67° C. |
|---|---|
| Hardness | 48 |
| Water absorption | 0.43% |
| Flexural strength | 16.0 kgf/mm$^2$ |
| Flexural modulas | 455 kgf/mm$^2$ |

EXAMPLE 5

A mixture of 29.2 g (0.08 mole) of bisphenol A-propylene oxide adducts and 16.1 g (0.16 mole) of succinic anhydride was heated at 155°-160° C. for 15 minutes. The mixture was cooled, and was added thereto 34.7 g (0.16 mole) of 1,3-bis(2-oxazolinyl-2)benzene and 0.80 g of p-toluenesulfonic acid, and the resulting mixture was heated to melt together. The mixture was then poured into a mold as used in Example 1 in advance heated to 180° C., and then was cured at 180° C. for 30 minutes.

After cooling, the cured sheet 3 mm in thickness was found to have the following properties:

| Heat deflection temperature | 82° C. |
|---|---|
| Hardness | 44 |
| Water absorption | 0.23% |
| Flexural strength | 12.5 kgf/mm$^2$ |
| Flexural modulas | 350 kgf/mm$^2$ |

EXAMPLE 6

A mixture of 7.3 g (0.07 mole) of diethylene glycol and 13.8 g (0.14 mole) of succinic anhydride was heated at 155° C. for 10 minutes. The mixture was cooled, and was added thereto 14.0 g (0.07 mole) of sebacic acid, 44.8 g (0.21 mole) of 1,3-bis(2-oxazolinyl-2)benzene and 0.80 g of triphenyl phosphite, and the resulting mixture was heated to melt together. The mixture was then poured into a mold as used in Example 1 in advance heated to 200° C., and then was cured at 200° C. for 1 hour.

After cooling, the cured sheet 3 mm in thickness was found to have the following properties:

| Heat deflection temperature | 55° C. |
|---|---|
| Hardness | 26 |
| Water absorption | 2.0% |
| Flexural strength | 10.7 kgf/mm$^2$ |
| Flexural modulas | 380 kgf/mm$^2$ |

EXAMPLE 7

A mixture of 7.5 g (0.08 mole) of 1,4-butanediol and 25.5 g (0.17 mole) of tetrahydrophthalic anhydride was heated at 150°-155° C. for 15 minutes. The reaction mixture was cooled, and was added thereto 27.0 g (0.13 mole) of 1,3-bis(2-oxazolinyl-2)benzene and 1.2 g of triphenyl phosphite. The mixture was placed in a test tube and was heated to melt, and was placed in an oil bath of 190° C. After 18 minutes the mixture gelled to a yellow infusible resin.

EXAMPLE 8

A mixture of 4.8 g (0.05 mole) of 1,4-butanediol and 17.8 g (0.11 mole) of hexahydrophthalic anhydride was heated at 155°–160° C. for 15 minutes. The reaction mixture was cooled, and was added thereto 18.0 g (0.08 mole) of 1,3-bis(2-oxazolinyl-2)benzene and 0.8 g of triphenyl phosphite. The mixture was placed in a test tube, heated to melt, and was placed in an oil bath of 200° C. After 28 minutes the mixture gelled to a yellow infusible resin.

EXAMPLE 9

A mixture of 7.4 g (0.08 mole) of 1,4-butanediol, 16.3 g (0.16 mole) of succinic anhydride, 26.4 g (0.12 mole) of 1,3-bis(2-oxazolinyl-2)benzene and 1.8 g of triphenyl phosphite was placed in a test tube and heated with occasional shaking in an oil bath of 190° C. After 150 seconds the mixture reached 190° C., and after 36 minutes the mixture gelled to a hard, transparent and pale amber colored resin.

EXAMPLE 10

A mixture of 4.3 g (0.02 mole) of tris(hydroxyethyl)isocyanurate, 8.8 g (0.05 mole) of methylhexahydrophthalic anhydride, 16.2 g (0.11 mole) of adipic acid, 50.7 g (0.23 mole) of 1,3-bis(2-oxazolinyl-2)benzene and 0.80 g of triphenyl phosphite was heated to 130° C. to melt together. The mixture was then poured into a mold as used in Example 1 heated in advance to 200° C., and then was cured at 200° C. for 1 hour.

After cooling, the cured sheet 3 mm in thickness was found to have the following properties:

| | |
|---|---|
| Heat deflection temperature | 97° C. |
| Water absorption | 0.90% |

EXAMPLE 11

In a 500 ml flask provided with a stirrer, an inlet for nitrogen gas, a distilling tube and a thermometer were placed 90 g (1 mole) of 1,4-butanediol and 438 g (3 mole) of adipic acid, and the mixture was heated at 200° C. for 5 hours. To 14.9 g (0.06 mole) of the resultant polyesterpolycarboxylic acid was added 19.4 g (0.09 mole) of 1,3-bis(2-oxazolinyl-2)-benzene and 0.2 g of triphenyl phosphite. The mixture was then heated in an oil bath of 190° C. to raise the temperature of the mixture to 150° C., and then the mixture gelled after 15 minutes.

After standing to cool for 20 minutes, a hard and transparent resin was obtained, which was found to retain its shape still at a temperature of about 200° C. or more and decompose at a temperature more than 270° C.

EXAMPLE 12

80 g (about 0.1 mole) of polycarbonatediol having an average molecular weight of about 800 prepared by the reaction of 1,6-hexanediol with ethylene carbonate was reacted with 20 g (0.2 mole) of adipic anhydride at 145°–145° C. for 20 minutes to provide a polyesterpolycarboxylic acid.

20 g (about 0.02 mole) of the polyesterpolycarboxylic acid, 8.6 g (0.04 mole) of 1,3-bis(2-oxazolinyl-2)benzene and 0.4 g of triphenyl phosphite were weighed into a test tube and the tube was placed in an oil bath of 200° C. with occasional shaking to raise the temperature of the mixture to 200° C., and then the mixture gelled after 15 minutes.

After cooling, the resin was found to be transparent and pale amber colored, and very resilient.

EXAMPLE 13

A mixture of 80 g (about 0.04 mole) of polycarbonatediol having an average molecular weight of about 2000 prepared by the reaction of 1,6-hexanediol with ethylene carbonate and 20 g (0.2 mole) of succinic anhydride was reacted at 140°–145° C. for 20 minutes to provide a polyesterpolycarboxylic acid.

To the polyesterpolycarboxylic acid were added 324 g (1.5 mole) of 1,3-bis(2-oxazolinyl-2)benzene and 180 g (0.96 mole) of azelaic acid and 8.9 g of triphenyl phosphite, and the mixture was heated to melt together. The molten mixture was then poured into a mold which had been in advance heated to 200° C., and then was left standing in an oven at 200° C. for 1 hour to allow the mixture to form a cross-linked resin. Two kinds of molds were used above; one having a cavity of 0.3 cm×30 cm×13 cm and the other having a cavity of 1.5 cm×19 cm×13 cm.

The resuling cured sheets 3 mm or 1.5 cm in thickness were subjected to measurements of the properties, which are shown in Table 1.

TABLE 1

| Properties | | MEASUREMENTS |
|---|---|---|
| Density | 1.23 | |
| Flexural strength (kgf/mm$^2$) | 9.9 | JIS K 6911 |
| Flexural modulas (kgf/mm$^2$) | 260 | JIS K 6911 |
| Tensile strength (kgf/mm$^2$) | 5.8 | JIS K 7113 |
| Tensile modulas (kgf/mm$^2$) | 200 | JIS K 7113 |
| Elongation at rupture (%) | 71 | JIS K 7113 |
| Compression strength (kgf/mm$^2$) | 8.7 | JIS K 7208 |
| Compression modulas (kgf/mm$^2$) | 230 | JIS K 7208 |
| Izod impact strength[1] (kgf · cm/cm) | 10.8 | ASTM D 256 |
| Heat deflection temperature[2] (°C.) | 62 | ASTM D 648 |
| Water absorption[3] (%) | 0.93 | JIS K 6911 |
| Taber abrasion resistance[4] (cm$^3$) | $25 \times 10^{-3}$ | JIS K 7204 |

Notes:
[1] With a notch.
[2] Under a load of 18.6 kg/cm$^2$.
[3] Increase in weight of a sheet 3 mm thick after immersing in water at 23° C. for 24 hours.
[4] With a Taber tester CS-17 at 1000 rpm under a load of 1 kg.

EXAMPLE 14

A mixture of 22 g (about 0.01 mole) of the same polyesterpolycarboxylic acid as in Example 13, 8.8 g (0.04 mole) of sebacic acid and 21.6 g (0.10 mole) of 1,3-bis(2-oxazolinyl-2)benzene was placed in a test tube and was heated under an atmosphere of nitrogen in an oil bath of 200° C. The mixture was found to gel after 10 hours.

EXAMPLE 15

A mixture of the polyesterpolycarboxylic acid prepared in Example 13, 1,3-bis(2-oxazolinyl-2)benzene and the reactive compound, i.e., a dicarboxylic acid or an aromatic hydroxy-carboxylic acid in amounts as shown in Table 2 was prepared, and was added thereto triphenyl phosphite in an amount of 1.5% by weight based on the weight of the mixture. The mixture was heated to melt together and then was poured into the same mold as in Example 1 in advance heated to 200° C., and then was left standing in an oven at 200° C. for 1 hour to allow the mixture to form a cross-linked resin.

After cooling, the cured sheet 3 mm in thickness was taken out of the mold, and was subjected to measurements of the properties, which are shown in Table 2.

TABLE 2

| Runs | Reactants | Amounts (moles) | Heat Deflection Temperature (°C.) | Flexural Strength (kgf/mm$^2$) | Flexural Modulas (kgf/mm$^2$) | Water Absorption (%) |
|---|---|---|---|---|---|---|
| 1 | Polyesterpolycarboxylic acid | 0.03 | 78 | 13.4 | 340 | 1.4 |
|   | 1,3-Bis(2-oxazolinyl-2)benzene | 1.5 | | | | |
|   | Adipic acid | 0.97 | | | | |
| 2 | Polyesterpolycarboxylic acid | 0.04 | 175 | 17.4 | 360 | 0.45 |
|   | 1,3-Bis(2-oxazolinyl-2)benzene | 2.5 | | | | |
|   | Azelaic acid | 0.34 | | | | |
|   | Terephthalic acid | 0.62 | | | | |
| 3 | Polyesterpolycarboxylic acid | 0.04 | 177 | 16.9 | 370 | 0.41 |
|   | 1,3-Bis(2-oxazolinyl-2)benzene | 2.5 | | | | |
|   | Sebacic acid | 0.28 | | | | |
|   | Salicylic acid | 0.34 | | | | |
|   | p-Hydroxybenzoic acid | 0.34 | | | | |
| 4 | Polyesterpolycarboxylic acid | 0.04 | 90 | 12.1 | 280 | 0.56 |
|   | 1,3-Bis(2-oxazolinyl-2)benzene | 1.5 | | | | |
|   | Sebacic acid | 0.58 | | | | |
|   | Terephthalic acid | 0.38 | | | | |

What is claimed is:

1. A process for producing a cross-linked resin which comprises: reacting a bis(2-oxazoline) compound with a polyesterpolycarboxylic acid which has carboxylic acid ester linkages in the molecule, in an equivalent ratio of the bis(2-oxazoline) compound to the carboxyls of the polyesterpolycarboxylic acid of not less than 1 at an elevated temperature; said polyesterpolycarboxylic acid being at least one selected from the group consisting of:

a polyesterpolycarboxylic acid prepared by the reaction of a polycarbonatediol with an aliphatic dicarboxylic acid or its anhydride; and wherein the reaction is carried out in the presence of an organic reactive compound as a further reactant which has at least one acidic active hydrogen in the molecule, in an equivalent ratio of the bis(2-oxazoline) compound to the total of the carboxyls of the polyesterpolycarboxylic acid and the active hydrogens of the organic reactive compound of not less than 1, the reactive compound being at least one selected from the group consisting of a dicarboxylic acid, a sulfonamide, an acid imide, an aromatic hydroxy-carboxylic acid and a bisphenolsulfone compound, and said reactive compound is not said polyesterpolycarboxylic acid, said reaction being carried out in the presence of a catalyst selected from the group consisting of a phosphorous acid ester, an organic phosphonous acid ester and an inorganic salt, and said catalyst being used in an amount of 0.1–5 percent by weight based on the weight of a mixture of the bis(2-oxazoline) compound, polyesterpolycarboxylic acid and organic reactive compound.

* * * * *